United States Patent [19]

Marc

[11] 4,441,876

[45] Apr. 10, 1984

[54] FLOW MOLDING

[76] Inventor: Michel Marc, 48 Ridge Hill Farm Rd., Wellesley, Mass. 02181

[21] Appl. No.: 301,313

[22] Filed: Sep. 11, 1981

Related U.S. Application Data

[63] Continuation of Ser. No. 41,982, May 24, 1979, abandoned.

[51] Int. Cl.³ .............................. B29C 1/02; B29G 7/00
[52] U.S. Cl. ................................ 425/174.8 E; 264/26; 425/DIG. 13; 425/DIG. 44
[58] Field of Search ................... 264/25, 26, DIG. 46, 264/313, 337; 425/174.8 R, 174.8 E, DIG. 44, DIG. 13

[56] References Cited

U.S. PATENT DOCUMENTS

| | | | |
|---|---|---|---|
| 2,179,261 | 11/1939 | Keller | 264/DIG. 46 |
| 2,200,771 | 4/1942 | Dufour et al. | 264/DIG. 46 |
| 2,280,771 | 4/1942 | Dufor et al. | 264/26 |
| 2,407,833 | 9/1946 | Jablonsky | 264/26 |
| 2,421,097 | 5/1947 | Lasko | 264/26 |
| 2,438,952 | 4/1948 | Grotenhuis | 264/11 |
| 2,467,782 | 4/1949 | Schuman | 264/DIG. 46 |
| 2,604,665 | 7/1952 | Bosomworth et al. | 264/26 |
| 2,626,428 | 1/1953 | Bosomworth | 264/DIG. 46 |
| 2,891,284 | 6/1959 | Levin et al. | 264/DIG. 46 |
| 2,922,865 | 1/1960 | Schattler et al. | 264/26 |
| 3,519,517 | 7/1970 | Dench | 264/26 |
| 3,647,741 | 3/1972 | Hutchinson | 524/588 |
| 3,791,906 | 2/1974 | Farkas | 156/245 |
| 4,110,139 | 8/1978 | Mashida et al. | 264/26 |

FOREIGN PATENT DOCUMENTS 2525265 12/1976 Fed. Rep. of Germany ...... 524/588

318546 1/1957 Switzerland.

OTHER PUBLICATIONS

Birks, Modern Dielectric Materials, Heywood, London (1960), pp. 147,150-153 & 158.
von Hippel, Dielectric and Waves, Wiley, N.Y. (1954), pp. 204,205,206.
Lee et al., Handbook of Epoxy Resins, McGraw-Hill N.Y., pp. 14-35, 14-38, 14-39.
Meals et al., "Silicones", Rheinhold, N.Y. (1959), pp. 44-47 and 131.

Primary Examiner—Willard E. Hoag
Attorney, Agent, or Firm—Wolf, Greenfield & Sacks

[57] ABSTRACT

A flow molding process and associated molding apparatus for making plastic parts or pieces utilizing a radio frequency heating fluid. The molding apparatus includes a pair of spaced electrodes, at least one of which supports a molding material which may be in the form of an imprinted diaphragm (mold) for forming an imprint on at least one side of the plastic piece being fabricated. The apparatus is, in particular, employed for forming pieces having different thicknesses throughout, the purpose being to provide uniform heating throughout the piece being fabricated regardless of the varying thicknesses thereof. This is accomplished by maintaining the capacitance constant throughout all different thickness sections of the piece. This may be accomplished by equalizing the dielectric constants between the thermoplastic or the like material and the diaphragm (mold) material. In another version of the invention the capacitance is equalized by altering the spacing between the main electrodes in the different thickness sections.

7 Claims, 8 Drawing Figures

FLOW MOLDING

This is a continuation of application Ser. No. 041,982, filed May 24, 1979, and now abandoned.

BACKGROUND OF THE INVENTION

The present invention relates in general to a flow molding process and associated apparatus. More particularly, the invention pertains to the forming of thermoplastic parts using radio frequency heating. The concepts of this invention are particularly adapted to the forming of multiple thickness pieces.

In the construction of the plastic parts using radio frequency heating, it is common to select the plastic material and the diaphragm on the basis of their power factor. Thus, in one prior art example there is employed thermoplastic polyvinylchloride which has a power factor on the order of 0.09. The diaphragm may be of a silicone rubber having a power factor on the order of 0.01. This 9 to 1 difference in power factor means that there will be substantially more heat dissipated in the plastic than in the diaphragm which is desirable. However, when there are different thicknesses of plastic that are being fabricated, the problem is that there will be an uneven distribution of heat in the plastic with the possibility of burnt areas especially in thicker sections of the plastic.

Accordingly, it is one object of the present invention to provide an improved method of molding plastic pieces and in particular those having non-uniform thickness throughout wherein a uniform heat is applied to the plastic piece throughout.

Another object of the present invention is to provide a process for forming plastic pieces of non-uniform thickness without causing a burning of the piece in particular in thicker areas thereof. It is also not uncommon to have a burning in a thicker sections while the thermoplastic in a thinner section is not sufficiently heated to flow properly.

SUMMARY OF THE INVENTION

To accomplish the foregoing and other objects of this invention there is provided a flow molding apparatus comprising a mold having a cavity therein for receiving a material which may be a plastic in liquid, powder or sheet form and which is to be finally formed into a finished piece. This apparatus and associated method is in particular for forming a plastic piece having sections of different thickness and to provide even heating in molding the piece throughout each section. The mold is defined by first and second electrodes spaced from each other and at least in part forming the mold for the piece. Means are provided for establishing an electromagnetic heating field across the electrodes. There is a mold material preferably in the form of a diaphragm (mold structure) disposed on at least one of the electrodes for forming at least one surface of the plastic piece. The plastic material, molding material and electrode separation are selected to provide a uniform capacitance between the electrodes throughout the different thickness sections. In accordance with one version the capacitance is maintained uniform by having the facing surfaces of the electrodes substantially equally spaced and by further having the dielectric constant of the plastic material substantially the same as the dielectric constant of the molding material. In accordance with one example, the molding material or diaphragm is silicone rubber and there may be added thereto a percentage of an additive material of a high dielectric constant to thus equalize the overall dielectric constant of the molding material and to match this dielectric constant to that of the plastic material. In accordance with this invention the additive material may be calcium titanate or titanium dioxide. In accordance with another aspect of this invention the capacitance may be maintained uniform by altering the electrode separation to essentially provide an appropriate step in at least one of the electrodes to match the capacitance between sections. In accordance with still another aspect of this invention the capacitance may be maintained uniform throughout different section by the inclusion of a third material which may possibly even be air, whereby the electrodes can be maintained in parallel spaced relationship without any steps in either electrode and further without any alteration of the dielectric constant of the plastic material or mold material itself.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

The present invention pertains primarily to the molding of a two-dimensional piece including a technique for obtaining a uniform heat in the plastic piece even though the piece may have an un-uniform thickness. For example, the techniques described herein may be used in constructing a shoe sole having areas of differing thickness.

Figure 1:
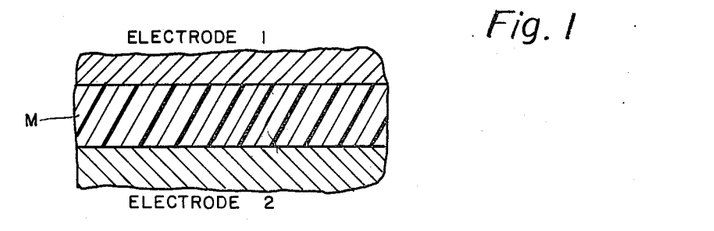
FIG. 1 shows a diagram of a pair of electrodes having a material of known dielectric constant therebetween.

The apparatus that is employed generally includes top and bottom electrodes, a master mold typically constructed of silicone rubber, and means for applying an RF heating field to the electrodes. FIG. 1 is an initial drawing usable in illustrating the principle of the present invention, that is of substantially equating the dielectric constant between the plastic and the mold material to thus provide uniformity of heating in the plastic piece regardless of the thickness thereof. It has been found and will be shown herein that by providing this substantially equal dielectric constant in both materials that the power dissipated in the plastic piece is essentially a function of the thickness thereof so that, for example, if a section of the piece is twice the thickness of a first section then the second section likewise has twice the power to thus provide a resultant of equal temperature in the plastic piece in both areas of thickness.

In FIG. 1 there are shown electrodes 1 and 2 having therebetween a material which may form the plastic piece and being of a constant predetermined dielectric constant. FIG. 1 is shown for the purpose of illustration principally to develop equations associated with that general form of construction. In fact, the arrangement of FIG. 1 is an electrical analog is a capacitor with the electrodes 1 and 2 representing the plates of the capacitor and the material M possibly representing the plastic piece being formed. Actually, as described hereinafter the matching of the dielectric constants is essentially tantamount to matching of the capacitors in the two separate sections depicted in FIG. 2 described hereinafter.

In the illustration of FIG. 1 the following parameters may be defined:

$\epsilon_r$ = relative dielectric constant
P.F. = power factor (or dissipation factor) at approximately 40 MHz.
U = R.F. voltage applied between the two electrodes in volts.
$X_c$ = capacitance of material M in ohms.
I = current flowing through material M in amperes.
F = frequency in Hertz of the R.F. energy source.
d = distance in inches between the two electrodes.
C = capacity in farads of material M.
S = electrode area (square inches).

The heat that is dissipated by the material M in FIG. 1 due to the R.F. energy source applied across the electrodes 1 and 2 may be given by the following equation:

$$P = RI^2 \quad (1)$$

The Ohms Law relationship may be expressed as:

$$I = \frac{U}{\sqrt{X_c^2 + R^2}} \quad (2)$$

Where, $$R = P.F. \times X_c \quad (3)$$

One assumption that can be made is that the material M in FIG. 1 between the two electrodes has a low power factor. For example, if the material is PVC (thermoplastic) the power factor may be 0.09. For silicione rubber the power factor may be 0.01 or could be lower. With such power factors for the material M and from equation (3) it can be seen that the real portion of the impedance is negligible in comparison to the imaginary part, or in other words $R^2$ is much less than $X_c^2$. Thus, equation (2) can be rewritten as follows:

$$I = \frac{U}{X_c}, \text{ or } I = \frac{U \times P.F.}{R}, \text{ or } I^2 = \frac{U^2 \times P.F.^2}{R^2} \quad (4)$$

From equations (1) and (4) it can be shown that:

$$P = \frac{R \times U^2 \times (P.F.)^2}{R^2} = \frac{U^2 \times (P.F.)^2}{R} \quad (5)$$

From equations (3) and (5) it can be shown that:

$$P = \frac{U^2 \times (P.F.)^2}{P.F. \times X_c} = \frac{U^2 \times P.F.}{X_c} \quad (6)$$

The magnitude of the term $X_c$ may be given by the following equation:

$$X_c = 1/\omega C \quad (7)$$

It is known that:

$$\omega = 2\pi f \quad (8)$$

Equations (7) and (8) can be combined to show that:

$$X_c = \frac{1}{2\pi f \times C} \quad (9)$$

The capacity C of the material M between the two electrodes of FIG. 1 may be given by the following equation:

$$C = \frac{\epsilon_r \times S \times 2.54 \times 10^{-6}}{4\pi \times d \times 9 \times 10^5} = \frac{\epsilon_r \times S \times 2.54 \times 10^{-11}}{36 \times \pi \times d} \quad (10)$$

Equations (9) and (10) can be combined to show that:

$$X_c = \frac{\pi \times 36 \times d}{2\pi f \times \epsilon_r \times S \times 2.54 \times 10^{-11}} = \frac{18 \times d}{f \times \epsilon_r \times S \times 2.54 \times 10^{-11}} \quad (11)$$

From equations (6) and (11) it can be shown that:

$$P = \frac{U^2 \times P.F. \times f \times \epsilon_r \times S \times 2.54 \times 10^{-11}}{18 \times d} \quad (12A)$$

The power dissipated into and thus the heat received by the material per square inch is then given by the following equation:

$$P' = \frac{U^2 \times P.F. \times f \times \epsilon_r \times 2.54 \times 10^{-11}}{18 \times d} \quad (12B)$$

The power received by the material per square inch and for 1 inch thickness is therefore:

$$P'' = \frac{U^2 \times P.F. \times f \times \epsilon_r \times 2.54 \times 10^{-11}}{18} \quad (12C)$$

Figure 2:
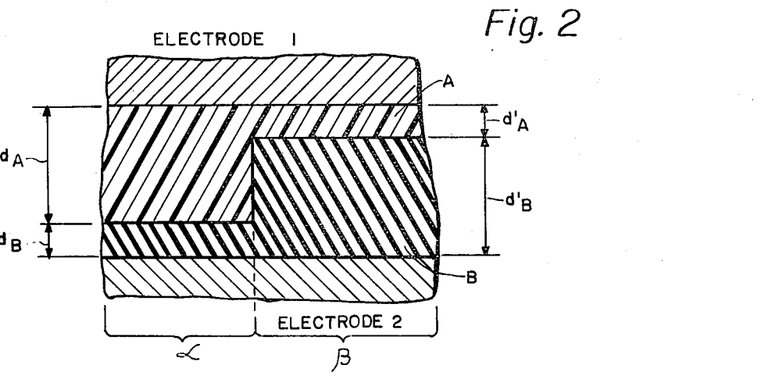
FIG. 2 shows the electrode pair having associated therewith an RF source and including two materials, one of which forms a mold material for forming the other material which is preferably a plastic material forming the piece.

Having established some basic equations with reference to the illustration of FIG. 1, reference is now made to FIG. 2 which also shows the electrodes 1 and 2 having disposed therebetween materials A and B. The material A may be polyvinylchloride (PVC) while the material B may be silicone rubber. Either of the materials A or B may have their basic composition altered in accordance with the teachings of this invention to equalize the dielectric constants as explained in further detail hereinafter. FIG. 2 also shows two different areas α and β each which relate to a different sandwich cross-section. In area α the material A is thicker than the material B whereas in the area β the material B is thicker than the material A. This difference in material represents a difference in the thickness of the plastic piece represented by material A that is being formed. The purpose of the derivation hereinafter is to establish that there is the same power dissipation per cubic inch in both areas even though the thicknesses vary; this being provided as shown hereinafter by equalizing the dielectric constants between materials A and B, in accordance with the preferred embodiment.

In FIG. 2 there are shown the appropriate dimensions in both areas. In area α the material A dimension is $d_A$ while the material B dimension is $d_B$. With regard to area β the material A dimension is $d_A'$ and the material B thickness is $d_B'$.

With regard to sandwich area α the current flowing through the both materials is the same and thus;

$$I_A = I_B = I_\alpha.$$

Thus, $$P_A = R_A \times (I_\alpha)^2 \quad (13)$$

Where $R_A$ is the resistance of material A. This resistance may also be expressed as:

$$R_A = \frac{P.F._A}{2\pi f C_A} \quad (14)$$

The current $I_\alpha$ associated with area α may be expressed as follows:

$$I_\alpha = U_\alpha / X_\alpha = U_\alpha \times 2\pi \times f \times C_\alpha \quad (15)$$

Where, $$C_\alpha = \frac{C_A \times C_B}{C_A + C_B} \quad (16)$$

With regard to equation (16) the value of the total capacitance $C_\alpha$ is represented by the series arrangements of the capacitances of materials A and B. Thus, equation (16) is a known equation. It is also assumed that the electrode area S in each section is the same for both the material A and the material B.

From equation (10) expressions can be derived for the capacitances $C_A$ and $C_B$. Thus, $$C_A = \frac{\epsilon_{rA} \times S_\alpha \times 2.54 \times 10^{-11}}{36\pi \times d_A} \quad (17A)$$

$$C_B = \frac{\epsilon_{rB} \times S_\alpha \times 2.54 \times 10^{-11}}{36 \times \pi \times d_B} \quad (17B)$$

By mathematical substitution of equations (17A) and (17B) into equation (16) one can define:

$$C_\alpha = \frac{\epsilon_{rA} \times \epsilon_{rB} \times S_\alpha \times 2.54 \times 10^{-11}}{36 \times \pi (\epsilon_{rA} \times d_B + \epsilon_{rB} \times d_A)} \quad (18)$$

By substituting equation (18) into equation (15) an expression for $I_\alpha$ is obtained as follows:

$$I_\alpha = \frac{U_\alpha \times f \times \epsilon_{rA} \times \epsilon_{rB} \times S_\alpha \times 2.54 \times 10^{-11}}{18(\epsilon_{rA} \times d_B + \epsilon_{rB} \times d_A)} \quad (19)$$

The value of $C_A$ from equation (17A) may now be substituted into equation (14) to provide:

$$R_A = \frac{P.F._A \times 18 \times d_A}{f \times \epsilon_{rA} \times S_\alpha \times 2.54 \times 10^{-11}} \quad (20)$$

Now, equation (19) and equation (20) may be substituted into original equation (13) to provide the following:

$$P_A = \frac{P.F._A \times U_\alpha^2 \times f \times S_\alpha \times 2.54 \times 10^{-11} \times \epsilon_{rA} \times \epsilon_{rB}^2 \times d_A}{18(\epsilon_{rA} \times d_B + \epsilon_{rB} \times d_A)^2} \quad (21)$$

Thus, equation (21) represents the power term with regard to material A with regard to area α. A very similar equation can be arrived at for the sandwich area β by assuming that $d_A$ becomes $d_A'$, $d_B$ becomes $d_B'$ and by further knowing that $\epsilon_{rA} = \epsilon'_{rA}$ and $\epsilon_{rB} = \epsilon'_{rB}$. By making these assumptions we can now derive the following equation:

$$P_A' = \frac{P.F._A \times U_\beta^2 \times f \times S_\beta \times 2.54 \times 10^{-11} \times \epsilon_{rA} \times \epsilon_{rB}^2 \times d_A'}{18(\epsilon_{rA} \times d_B' + \epsilon_{rB} \times d_A')^2} \quad (22)$$

Having derived equations (21) and (22) a comparison can now be made between the power received in the material A in both sections illustrated in FIG. 2. With regard to section α the following equation applies:

$$P_A/\text{inch}^2 \text{ of area} = \quad (23)$$

$$\frac{P.F._A \times U_\alpha^2 \times f \times 2.54 \times 10^{-11} \times \epsilon_{rA} \times \epsilon_{rB}^2 \times d_A}{18(\epsilon_{rA} \times d_B + \epsilon_{rB} \times d_A)^2}$$

With regard to the section β the following equation applies:

$$P_A'/\text{inch}^2 \text{ of area} = \quad (24)$$

$$\frac{P.F._A \times U_\beta^2 \times f \times 2.54 \times 10^{-11} \times \epsilon_{rA} \times \epsilon_{rB}^2 \times d_A'}{18(\epsilon_{rA} \times d_B' + \epsilon_{rB} \times d_A')^2}$$

The ratio of these two quantities may now be expressed as follows:

$$\frac{P_A/\text{inch}^2}{P_A'/\text{inch}^2} = \frac{d_A(\epsilon_{rA} \times d_B' + \epsilon_{rB} \times d_A')^2}{d_A'(\epsilon_{rA} \times d_B + \epsilon_{rB} \times d_A)^2} \quad (25)$$

By way of example, it can be assumed in one example the material A may be PVC having a dielectric constant of 6. The material B may be silicone rubber having a dielectric constant of 3. Furthermore, the distances $d_A$ and $d_B'$ may be ⅜ inch and the dimensions $d_A'$ and $d_B$ may be ⅛ inch. The power factor for the PVC may typically be 0.09 while the power factor for the silicone rubber may be 0.01. If these quantities are substituted into equation (25) then the ratio is as follows:

$$\frac{d_A \times (6 \times \frac{1}{8} + 3 \times \frac{1}{8})^2}{d_{A'} \times (6 \times \frac{1}{8} + 3 \times \frac{1}{8})^2} = \frac{P_A}{P_{A'}} = 2.47 \frac{d_A}{d_{A'}} \tag{26}$$

Thus, due primarily to the use of materials having different dielectric constants and by substituting into equation (26) the difference in the values of the thicknesses of material A it can be shown that the power dissipated on a per square inch basis in the thicker section inn area $\alpha$ is greater than 2 times the power dissipated in the thinner section in area $\beta$.

Actually, from equation (25) it can be seen that the ratio will vary as a function of both the thickness and the dielectric constant. However, by having the two materials A and B both the same dielectric constant then $\epsilon_{rA} = \epsilon_{rB} = \epsilon_r$. Equation (25) thus can be written as:

$$\frac{P_A}{P_{A'}} = \frac{d_A \epsilon_r (d_{A'} + d_{B'})^2}{d_{A'} \epsilon_r (d_A + d_B)^2} = \frac{d_A}{d_{A'}} \times \left(\frac{d_{A'} + d_{B'}}{d_A + d_B}\right)^2 \tag{27}$$

Because the two electrodes as depicted in FIG. 2 are flat and parallel the quantity $d_A + d_B = d'_A + d'_B$. Therefore, $$P_A/P'_A = d_A/d'_A \text{ or } P_A/d_A = P'_A/d'_A \tag{28}$$

Thus, the ratio of the power dissipated in area $\alpha$ per inch thickness of material A is equal to the power dissipated in area $\beta$ per inch thickness of material B. Therefore, there is the same heating effect and thus the same temperature generated in material A even though the thickness of material varies from one area to the other. In other words the power dissipated by material A in section $\alpha$ is proportional to the dimension $d_A$ while the power dissipated by $d_A$ in section $\beta$ is proportional to $d'_A$. Therefore, there will be obtained an even temperature through the material A regardless of the thickness thereof so long as the molding material B has the same dielectric constant as the material A. Similarly, the material B will also have the same temperature throughout its different thickness sections. However, the power received by material A is proportional to its power factor as is the power received by the material B. Thus, even though in any one material the dissipation is uniform the temperature of the materials A and B will not be generally the same.

From equations (27) and (28) and considering the example of FIG. 2 described in association with equation (26), it can be seen that the difference in the distances $d_A$ and $d'_A$ is in the ratio of 5 to 1. The total power applied is also in the same ratio and thus the net heating effect is the same in either area $\alpha$ or $\beta$.

Equation (19) has described previously an expression for $I_\alpha$. An identical equation can also be formed for the quantity $I_\beta$. The ratio of these two quantities can be expressed as follows:

$$\frac{I_\alpha/\text{inch}^2}{I_\beta/\text{inch}^2} = \frac{\epsilon_{rA} \times d_{B'} + \epsilon_{rB} \times d_{A'}}{\epsilon_{rA} \times d_B + \epsilon_{rB} \times d_A} \tag{29}$$

Again, if $\epsilon_{RA} = \epsilon_{rB} = \epsilon_r$ for materials A and B, then this ratio is equal to unity. Thus, when the identical dielectric constants are used, there is also the same current flowing in any of the sections $\alpha$ or $\beta$ even though the thicknesses of the materials A and B differ. Similarly, it can be shown that the resistances $R_A$ and $R_A'$ are identical in either one of these sections. Thus, the temperature will be the same in either section $\alpha$ or $\beta$.

In summary, the power for a one inch thickness of material dissipated in the material A or in the material B is the same even though the material thickness varies. Secondly, the power dissipated for a one inch thickness of material dissipated in materials A and B will differ between these materials by the the ratio of the power factors. However, as far as the equality of dissipation in one of the materials is concerned the power factor is not the controlling parameter but instead the dielectric constant is controlling and in particular the equalization of this dielectric constant for materials A and B.

The dielectric constants of materials A and B may be matched in many different ways. Thermoplastic materials can be found having varied dielectric constants, or, for example, if plastisol is used, its dielectric constant can be altered, for example, by the use of solvents. As far as the material from which the mold is made is concerned, this can also be selected from many different materials. Silicone rubber, which is a typical molding material also can be provided in different types having different dielectric constants. Furthermore, other materials could be used such as an epoxy resin with a filler or polyurethane. All of the known techniques employing a mold and a plastic to be made into a part do not employ like dielectric constants.

The preferred technique is to modify the molding material by mixing different compounds or substances to arrive at the same dielectric constant as that of the thermoplastic material which is to be made into the part. For example, one can start with silicone rubber which may have a dielectric constant in the range of 2.8 to 4.1 (the plastic may have a dielectric constant in the range of 4.5–6.0) and arrive at a proper dielectric constant by mixing with the silicone rubber in a proper percentage, some other material having a high dielectric constant such as calcium titanate $CaTiO_3$ or titanium dioxide $TiO_2$. Because it is desired to have more heat dissipated in the plastic than in the mold material it is also preferred to select as an additive to the silicone rubber a material which has a low power factor. It has been found that the calcium titanate may be added to the silicone rubber at about a 20% rate to increase the dielectric constant to that on the order of the dielectric constant of the thermoplastic material. A specific example is given hereinafter with regard to the modification of the silicone rubber to provide the equalization of the dielectric constants.

Another technique for equalizing the dielectric constant is to use a third material in each of the sections which may have a different thickness or maybe a different material in each section the purpose being to equalize the dielectric constant in each section or, in other words to equalize the capacitance in each section of the material to thus provide the equalization of heating throughout the plastic part. The advantage to this technique is that there is no need for altering the mold material but on the other hand, this does require the use of a third material in association with the mold.

Figure 3:
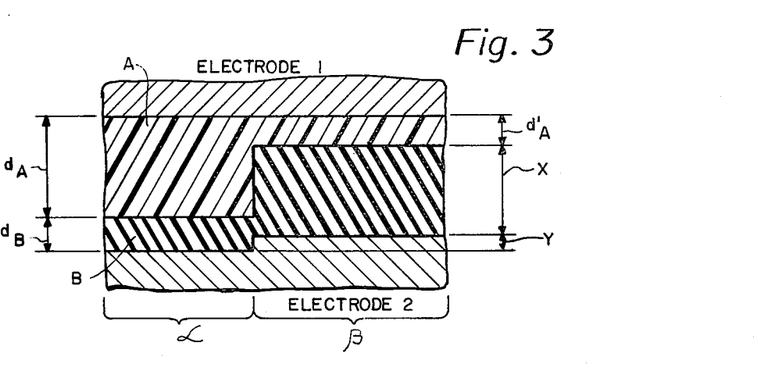
FIG. 3 shows an alternate construction for the molding apparatus for also providing uniform heating of the plastic piece.

FIG. 3 depicts an alternate embodiment of the present invention involving an alteration of the electrode construction so as to essentially equalize the capacitance in each section $\alpha$ and $\beta$ and thus provide uniform heating. Actually, in the first embodiment of FIG. 2 by equalizing the dielectric constant in the two sections, one is equalizing the capacitances in these sections. It can be seen from, for example, equation (17A) that the capacitance is a direct function of the dielectric constant and an inverse function of the distance d. In the first example of FIG. 2 it has been assumed that the electrode spacing and thus the distance d is the same for each section, and the capacitors were equalized by virtue of matching the dielectric constants. In the arrangement of FIG. 3 the dielectric constants are maintained unaltered and the capacitance is equalized by alteration of the electrode spacing at at least one of the sections.

With regard to FIG. 3 it can be seen that the same current will have to flow in each section $\alpha$ and $\beta$ to provide even heat throughout the material A which is the plastic material being formed. Assuming that there is the same voltage being applied to the electrodes 1 and 2 and assuming material of low power factor, then equation (2) can be rewritten as:

$$I = U/X_c \quad (30)$$

From equation (30) it can be seen that in order to provide uniform heat there must be the same capacitance $X_c$ in each of the sections $\alpha$ and $\beta$. ($C_\alpha = C_\beta$)

In FIG. 3 the thicknesses of the plastic material A are denoted the same as in FIG. 2 represented as distances $d_A$ and $d'_A$. In section $\alpha$ the molding material B has a dimension $d_B$ and in section $\beta$ the thickness of the mold material is represented by a variable x. It is the dimension x that can be calculated based upon dielectric constants of the materials A and B and the other dimensions defined in FIG. 3.

Equation (18) can be rewritten as follows:

$$C_\alpha/\text{inch}^2 = \frac{C_A \times C_B}{C_A + C_B} = \frac{\epsilon_A \times \epsilon_B \times 2.54 \times 10^{-11}}{36\pi(\epsilon_A d_B + \epsilon_B d_A)} \quad (31)$$

Similarly, an expression for $C_\beta$ can be derived as follows:

$$C_\beta/\text{inch}^2 = \frac{\epsilon_A \times \epsilon_B \times 2.54 \times 10^{-11}}{36\pi(\epsilon_A x + \epsilon_B d'_A)} \quad (32)$$

In equations (31) and (32) the following relationship is derived based upon $C_\alpha = C_\beta$:

$$\epsilon_A d_B + \epsilon_B d_A = \epsilon_A x + \epsilon_B d'_A \quad (33)$$

From equation (33) the dielectric constants of the two materials A and B can be considered as fixed known quantities. Similarly, depending upon the particular part being fabricated, it can be assumed that the dimensions $d_A$ and $d'_A$ are known. One can then fix the quantity $d_B$ and solve equation (33) for the quantity or thickness x. When this done the following equation is derived:

$$x = \frac{\epsilon_A d_B + \epsilon_B(d_A - d'_A)}{\epsilon_A} \quad (34)$$

From FIG. 3 and equation (34) it can be seen that the step in the electrode 2 has a dimension y as given by the following equation:

$$Y = d_A + d_B - d'_A - x \quad (35)$$

Of the embodiments of the invention shown in FIGS. 2 and 3, the first embodiment is the preferred in that it is believed to be easier to alter the dielectric constant rather than providing a special type of electrode construction which may have very many different dimensions depending upon the complexity of the outline of the particular part being formed.

With regard to the embodiment of FIG. 3 it is noted that depending upon the dimensions of the piece and the dielectric constants the quantity x could be calculated to provide an electrode 2 that steps outwardly rather than inwardly. The equation provides a sufficiently large magnitude of the distance x. Furthermore, the electrode 1 could be altered instead of the electrode 2 or in still another embodiment both electrodes could be altered. The purpose in altering the electrodes, or in the embodiment of FIG. 2 of equalizing the dielectric constants, is to maintain the capacitance the same at each section of the construction. If there are more than two sections as shown, then the equalization of the capacitance is made at all such sections.

The plastic part may be made of a liquid vinyl such as plastisol sold by Industrial Solvents, Inc. identified as their product Indusol EV-50. This is preferably in a liquid form which makes it ideal for filling a cavity, in particular when there are different thicknesses. The base mold material that is preferably chosen is silicone rubber, RTV-45 made by General Electric. The silicone rubber easily resists the higher temperatures that are used in the molding process. Also, the silicone rubber can pick up from the master and reproduce on the plastic a very fine, virtually perfect imprint. The silicone rubber also has a very low power factor which may be on the order of 0.01 so that there is not very much heat dissipated under the radio frequency heating. Also, the silicone rubber is quite pliable and even when the plastic part has a reverse angle it can be easily removed from the silicone rubber mold.

The preferred additive material to be added to the silicone rubber is calcium titanate $CaTiO_3$ at a 99.5% purity. This may be obtained in a very fine powder form of 2 microns size. Calcium titanate has been used because, inter alia, it does not significantly increase the viscosity of the silicone rubber so that it is easy to pour the molding material over the master. Furthermore, calcium titanate has a very high dielectric constant. Because the thermoplastic has a higher dielectric constant than the silicone rubber but usually not that much greater than the silicone rubber, a relatively small percentage of calcium titanate is needed to raise the dielectric constant of the silicone rubber. Also, the additive material has a low power factor, even lower than that of the silicone rubber so that the combined mold material will not heat as much as the silicone rubber used alone.

The value of the dielectric constant and the power factor will change with frequency and temperature. The following table shows the values of the dielectric constant and the power factor at a frequency of 40 MHz which is the frequency of the RF energy source. These parameters are shown at an average value during the heating of the plastic from 70° F. which is ambient temperature to a curing temperature of 375° F.

| Material | Dielectric Constant | Power Factor |
|---|---|---|
| Silicone Rubber RTV-45 | 4.04 | .01 |
| Calcium Titanate $CaTiO_3$ | 167.5 | .00032 |
| Plastic EV-50 | 4.8 | .09 |

Figure 4:
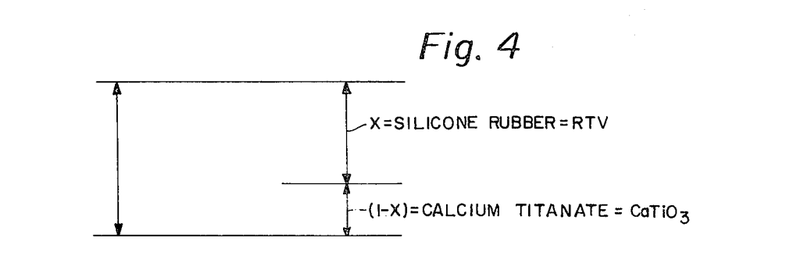
FIG. 4 is a diagram helpful in calculating the percentage of calcium titanate that has to be added to the silicone rubber to equalize the dielectric constants.

The task is now to determine the percentage x of calcium titanate that is to be mixed with the silicone rubber to obtain a mixture of dielectric constant equal to 4.8, which is the dielectric constant of the plastic EV-50. In this regard, please refer to the diagram of FIG. 4 which illustrates that the dimension x represents the percentage of silicone rubber and the dimension $x-1$ represents the dimension for the calcium tinanate.

From equation (10) the following capacitances can be derived per square inch of surface:

$$C_{RTV}/\text{inch}^2 = \frac{\epsilon_{RTV} \times 2.54 \times 10^{-11}}{36 \times \pi \times x}, \quad (36A)$$

$$C_{CaTiO_3}/\text{inch}^2 = \frac{\epsilon_{CaTiO_3} \times 2.54 \times 10^{-11}}{36\pi(1-x)} \quad (36B)$$

The total equivalent capacity of the mold is given by the parameter $C_1$ as follows:

$$C_1/\text{inch}^2 = \frac{C_{RTV} \times C_{CaTiO_3}}{C_{RTV} + C_{CaTiO_3}}, \quad (37)$$

or which may also be written as:

$$C_1/\text{inch}^2 = \frac{\epsilon_{RTV} \times \epsilon_{CaTiO_3} \times 2.54 \times 10^{-11}}{[(1-x)\epsilon_{RTV} + x\epsilon_{CaTiO_3}]36\pi} \quad (38)$$

The capacitors for a 1" thick portion of plastic may be represented by the following equation:

$$C_2/\text{inch}^2 = \frac{\epsilon_{EV-50} \times 2.54 \times 10^{-11}}{36\pi \times 1} \quad (39)$$

By setting $C_1 = C_2$ then the following equation is derived:

$$\epsilon_{EV-50} = \frac{\epsilon_{RTV} \times \epsilon_{CaTiO_3}}{(1-x)\epsilon_{RTV} + x\epsilon_{CaTiO_3}} \quad (40)$$

From equation (40) one can solve for the unknown x and determine for the example given in the following table that $x=0.838$ and $1-x=0.162$.

Thus, on a volume basis the mold material is to be made from 83.8% silicone rubber and 16.2% calcium tinanate so as to have a dielectric constant of 4.8, which is equal to that of the dielectric constant of the plastic part to be formed.

The above derivation has been based upon volume. A similar derivation can also be arrived at based upon the percentage by weight which is easier to work with than comparing volumes. The following formula is useful in converting from a volume percentage to a weight percentage:

$$\% \text{ wt. of calcium titanate} = \frac{(1-x) \times S.G.(CaTiO_3)}{(x) \times S.G.(S.R.) + (1-x) \times S.G.(CaTiO_3)} \quad (41)$$

Figure 5:
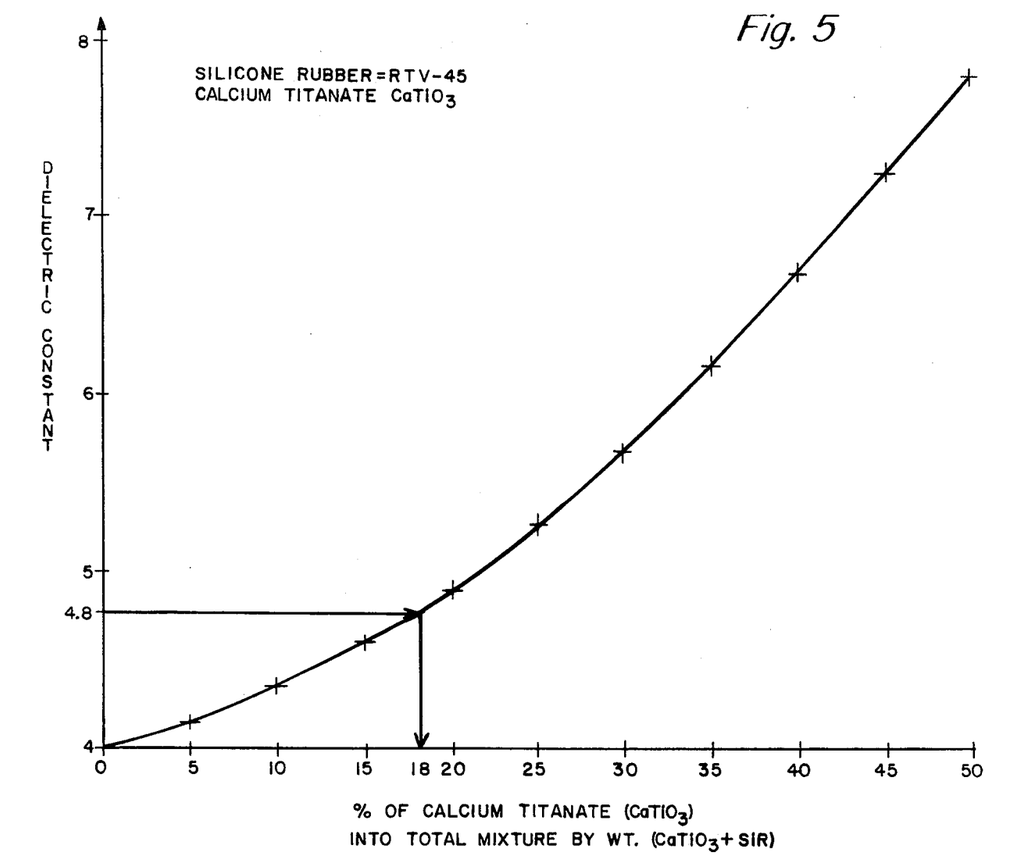
FIG. 5 is a curve of the dielectric constant versus the percentage of calcium titanate added to the base of silicone rubber RTV-45.

With equation (41) and knowing that the specific gravity of silicone rubber is 1.48 and the specific gravity of calcium titanate is 1.68 then equation (41) can be solved to determine that on the order of 18% of calcium titanate by weight is added to the total mixture with the rest of the mixture being silicone rubber in the amount of 82% by weight. In this regard reference is also now made to the graph of FIG. 5 which shows a curve on an experimental basis indicating the percent of calcium titanate that has been added and the corresponding dielectric constant. It can be seen that at a percentage of on the order of 18% from the curve the dielectric constant is on the order of 4.8. Thus, the theoretic calculations do correspond quite accurately with the experimental calculations as exemplified by the graph of FIG. 5.

Figure 6:
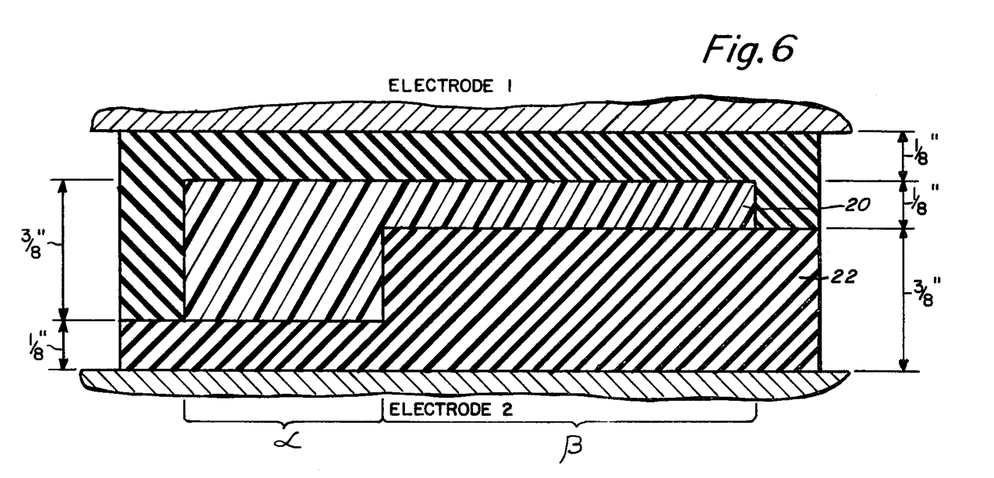
FIG. 6 is a diagram similar to the one shown in FIG. 2 using the construction of a shoe sole.

FIG. 6 shows an illustration similar to the one previously discussed in FIG. 2. FIG. 6 shows a shoe sole 20, a pair of electrodes used in the RF heating apparatus and the molding material 22, which has been made of a mixture of approximately 18% calcium titanate and 82% silicone rubber, RTV-45. FIG. 6 also shows the two sections $\alpha$ and $\beta$. In this example, for the sake of simplicity, in section $\alpha$ the plastic part has a thickness of $\tfrac{3}{8}$" and the thickness in the section $\beta$ is $\tfrac{1}{8}$". The following table II shows measured values for certain parameters such as capacitances, resistances and power dissipated. These measured values will be compared with calculations made hereinafter.

TABLE II

|  |  | P.F. power factor | $\epsilon_r$ dielectric constant | $C_{PF}$/ inch$^2$ | R ohms 1 inch$^2$ 40 MHz | $X_c$ | Power received w/inch |
|---|---|---|---|---|---|---|---|
| Section $\alpha$ | ¼ molding material | .009957 | 4.8 | 4.312 | 9.19 |  | 15.5 |
|  | ⅜ plastisol | .09 | 4.8 | 2.875 | 124.55 |  | 210.5 w/i |
|  | Combination | .058 | 4.8 | 1.725 | 133.74 | 2,306.6Ω | 226 |
| Section $\beta$ | ½ molding material | .009957 | 4.8 | 2.156 | 18.38 |  |  |
|  | ⅛ plastisol | .09 | 4.8 | 8.625 | 41.52 |  | 70.17 w/i |
|  | Combination | .026 | 4.8 | 1.725 | 59.9 | 2,306.6Ω |  |

From equation (10) the capacitances for the ¼" of molding material in Section $\alpha$ can be calculated as $C/\text{inch}^2 = 4.312 \times 10^{-12}$. The capacitances for the ⅜" plastisol can also be calculated from equation (10) and is found to be $2.875 \times 10^{-12}$ Farad.

From equations (3) and (9) one can write the expression:

$$R = P.F./2 \pi f C \quad (42)$$

For the ⅜" plastisol one can solve equation (42) to obtain a resistance $R = 124.55$ ohms.

Before determining the resistance of the ¼" molding material the power factor has to be determined. It is known that:

$$C_{RTV}/\text{inch}^2 = \frac{\epsilon_{RTV} \times 2.54 \times 10^{-11}}{36 \times \pi \times x} \text{ with } \epsilon_{RTV} = 4.04 \text{ from Table I and}$$

$$C_{CaTiO_3}/\text{inch}^2 = \frac{\epsilon_{CaTiO_3} \times 2.54 \times 10^{-11}}{36\pi(1-x)} \text{ with } \epsilon_{CaTiO_3} = 167.5 \text{ from Table I}$$

from equation (40) one can determine that $x=0.838$, and thus by substitution above it can be determined that:

$C_{RTV}/\text{inch}^2 = 1.083 \times 10^{-12}$ farad and
$CaTiO_3/\text{inch}^2 = 232.21 \times 10^{-12}$ farad.

Also, it can be determined that;

$$C_{mold}/\text{inch}^2 = \frac{4.8 \times 2.54 \times 10^{-11}}{36 \times \pi} = 1.078 \times 10^{-12}$$

From equation (42) the resistance for the different materials can be solved so that:

$R_{RTV}/\text{inch}^2$ (@40 MHz) = 36.748 ohms, see table I $R_{CaTiO_3}/\text{inch}^2$ (@40 MHz) = 0.00548 ohms, see table I $R_{mold}/\text{inch}^2$ (@40 MHz) = $R_{RTV}/\text{inch}^2 + R_{CaTiO_3}/\text{inch}^2 =$ $$36.735 \text{ ohms} = \frac{\text{P.F. mold} \times 10^6}{2 \times \pi \times 40 \times 1.078}$$

Thus, one can solve for the power factor of the mold which is 0.00995 which is significantly lower than the power factor of the RTV itself. The resistance of the ¼ molding material at a frequency of 40 MHz can be calculated from equation (42) as 9.188 ohms.

One can now determine that:

$$R_{plastisol} + R_{mold} = 133.74 \text{ ohms} \tag{43}$$

The capacitance of the combination is given by the following equation:

$$C_{comb.} = \frac{C_{plastisol} \times C_{mold}}{C_{plastisol} + C_{mold}} = 1.725 \text{ pF} \tag{44}$$

The power factor of the combination is given by the following equation:

$$\text{P.F. of Combination} = R \times 2\pi \times f \times C = 0.058 \tag{45}$$

The reactance of the combination is given by the following equation derived from equation (9):

$$X_c \text{ of combination} = 2306.6 \text{ phms} \tag{46}$$

If it is assumed that an RF voltage of 3,000 volts at 40 MHz is applied between the electrodes the current passing through the mold in Amperes I is given by the following equation;

$$I = \frac{U}{\sqrt{X_c^2 + R^2}} = \frac{3,000}{\sqrt{(2,306.6)^2 + (133.74)^2}} = 1.2984A \tag{47}$$

It can be seen from equation (47) that the second term under the square root is substantially smaller than the first term and thus we can approximate by using the equation:

$$I = U/X_c = 3,000/2,306.6 = 1.3006 \text{ A.} \tag{48}$$

It can be seen that the difference between the values of currents from equations (47) and (48) is negligible and thus there is essentially no error in using the result of equation (48).

The power received by the ⅜ plastisol in Section α is given by:

$$P = RI^2 = 124.55 \times 1.69 = 210.49 \text{ watts/inch}^2 \tag{49}$$

making the same calculation for Section β the power received by the ¼" plastisol in Section β is;

$P = RI^2 = 41.52 \times 1.69 = 70.17$ watts/inch² (see Table II)

Thus, it has been proven that the power received by the ⅜" thickness of plastisol in Section α is three times more than the power received by the ¼" thickness of plastisol in Section β. With the same specific heat being provided in both sections then the temperature of the plastic in Section α will be identical to the temperature of the plastic in Section β. Also, it can be seen that most of the power delivered by the apparatus (in Section α) 226 watts, has been delivered to the plastic with only 7% of the power being delivered to the mold material. This thus makes for a very efficient molding process.

Figure 7:
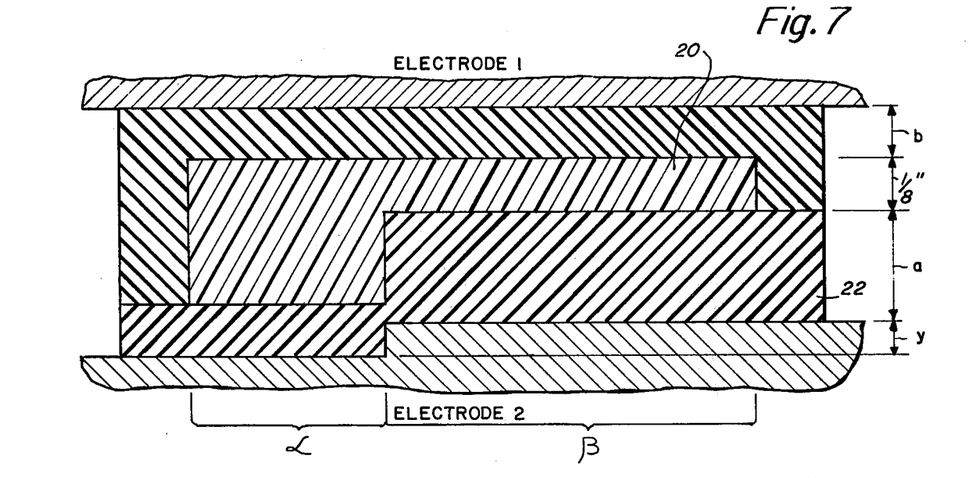
FIG. 7 is a further diagram showing the construction of shoe sole and similar to the diagram previously discussed with reference to FIG. 3.

FIG. 7 shows a further diagram helpful in illustrating another technique of the invention previously discussed in association with FIG. 3. FIG. 7 also shows the sole 20, electrodes and mold material 22. In this case the mold material is preferably silicone rubber RTV-45 without any additives. In FIG. 7 $x = a + b$. The dimension of y along with the dimension x is to be calculated. Again, this is done on the basis of equalizing the capacitances in the two Sections α and β. With regard to the Section α it can be determined from equation (10) that the capacitance for ¼" molding material is 3.63 pF. It is known that the capacitance of the ⅜" plastisol is 2.875 pF and thus the combination of the two, from equation (16), yields a capacitance $C_{60} = 1.604$ pF. The capacitance in the Section β is a function of the dimensions x or y. The following equation represents the capacitance in Section β;

$$C_\beta = \frac{7.8255}{8.625x + .9073} \tag{49A}$$

By equating $C_\beta$ and $C_\alpha$ one can then solve for x which is found in this example to be $x = 0.46''$. In Section α the electrode spacing is 0.625 inches. In section β the electrode spacing is equal to the quantity x added to 0.125 inches which in turn is equal to 0.585. Therefore, the electrode buildup or dimension y is calculated in this example to be 0.040 inch to provide the even heating effect in both Sections α and β.

Figure 8:
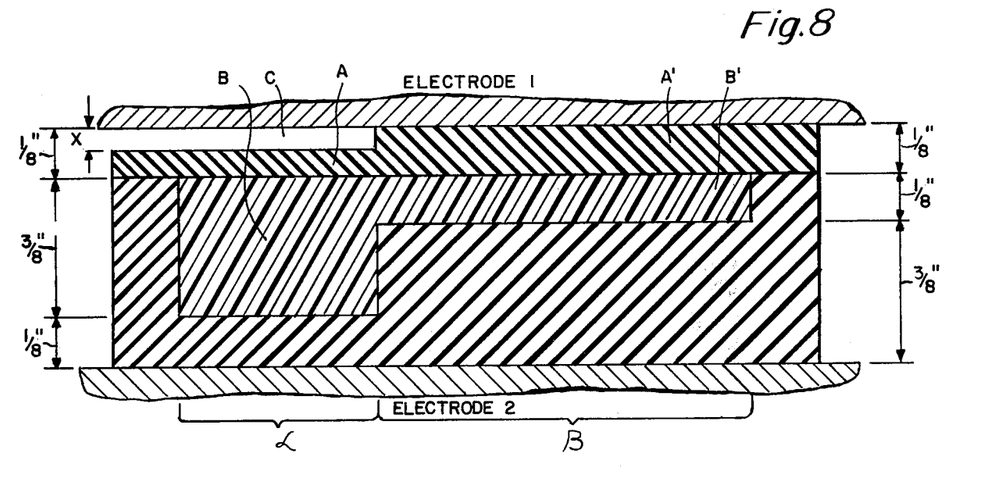
FIG. 8 is a further diagram showing the construction of a plastic piece such as a shoe sole employing a third material for a balancing capacitance in different sections of the mold.

In accordance with a further feature of the present invention, rather than altering the electrode spacing or changing the composition of either the plastic material or the mold material, one can include a third material in either of the sections depending upon the dielectric constant of this third material. This further embodiment of the invention is depicted in FIG. 8 showing a piece being fabricated of similar construction to the piece shown and previously described in, for example, FIG. 6. In FIG. 8 the third material is air identified by the reference character C. The mold material is identified by the reference characters A and A' while the plastic material is identified by the reference characters B and B'. The materials A' and B' are denoted as such because they appear in Section $\beta$. It is noted in FIG. 8 that the spacing between the electrodes is constant without the need for any step in either one of the electrodes. The following is an analysis and comparison of the capacitances in both sections to provide even heating in the plastic in both sections. This analysis involves a calculation of the connection x shown in FIG. 8 which is the thickness of the air space C.

From equation (10) a general equation can be derived as follows:

$$C_A = \frac{C_{(\frac{1}{4}''-x)RTV}}{inch^2} = \frac{4.04 \times 25.4}{36 \times \pi \times (\frac{1}{4} - x)} = \frac{.9073}{.25 - x} \text{ pF} \quad (51A)$$

$$C_B = \frac{C_{\frac{1}{8}''EV-50}}{inch^2} = \frac{4.8 \times 25.4}{36 \times \pi \times \frac{1}{8}} = 2.8747 \text{ pF} \quad (51B)$$

$$C_C = \frac{C_{x''air}}{inch^2} = \frac{1.0006 \times 25.4}{36 \times \pi \times x} = \frac{.22472}{x} \text{ pF} \quad (51C)$$

$$\frac{C_{combination\,\alpha}}{inch^2} = \frac{C_A \times C_B \times C_C}{C_A C_B + C_B C_C + C_A C_C} \text{ or}$$

$$\frac{C_{combination\,\alpha}}{inch^2} = \frac{.58612}{.36539 + 1.9622x}$$

The following relative dielectric constants are also used.

$\epsilon_r$ of dry air = 1.0006, $\epsilon_r$ of RTV-45 = 4.04, and $\epsilon_r$ of EV-50 = 4.8

In Section $\alpha$ the following equation can be written:

$$C_{A'} = \frac{C_{\frac{1}{4}''RTV}}{inch^2} = \frac{4.04 \times 25.4}{36\pi \times \frac{1}{4}} = 1.81465 \text{ pF} \quad (52A)$$

$$C_{B'} = \frac{C_{\frac{1}{8}''EV-50}}{inch^2} = \frac{4.8 \times 25.4}{36\pi \times \frac{1}{8}} = 8.624 \text{ pF} \quad (52B)$$

$$\frac{C \text{ of combination } \beta}{inch^2} = \frac{C_{A'} \times C_{B'}}{C_{A'} + C_{B'}}$$

$$\frac{C \text{ combination } \beta}{inch^2} = \frac{1.81465 \times 8.624}{1.81465 + 8.624} = 1.499 \text{ pF}$$

In Section $\beta$ the following two equations apply;

$$C/inch^2 = \frac{\epsilon_r \times 25.4}{36 \times \pi \times d} \text{ pF (pico farad) with } d = \quad (50)$$

thickness in inches.

Again, to provide the even heat in both Sections $\alpha$ and $\beta$ the capacitances are to be equalized and thus;

$$\frac{C \text{ combination } \alpha}{inch^2} = \frac{C \text{ combination } \beta}{inch^2}, \text{ or} \quad (53)$$

$$\frac{.58612}{.36539 + 1.9622x} = 1.499$$

From equation (53) and the substituted values one can solve for x and determine that x=0.013".

Because air has a dielectric constant less than that of the mold material the air passage C is provided in connection with the thicker section of plastic. However, if instead of air another material is used such as possibly even calcium titanate then the third material would be used in association with Section $\beta$ and not Section $\alpha$.

What is claimed is:

1. An apparatus for molding a part having at least two sections of different thicknesses and for providing uniform heating throughout each section, said apparatus comprising:
   first and second electrodes uniformly spaced from each other;
   means defining a mold cavity between said electrodes for molding a part from a material to be molded, said mold cavity having different dimensions measured along lines perpendicular to said electrodes in the different portions thereof that form the different sections of the part; and
   means for establishing a capacitive electromagnetic heating field between said electrodes;
   said defining means being formed of a mold material and an additive material, said additive material being different from said mold material and also different from the material to be molded, said additive material having a high dielectric constant higher than the dielectric constant of the material to be molded and at least an order of magnitude higher than the dielectric constant of said mold material, said mold material and said additive material both having a power factor lower than the material to be molded, said additive material being added to said mold material to equalize the dielectric constant between the material to be molded and said defining means to provide a uniform capacitance at all locations between said electrodes across said mold cavity throughout said different portions thereof and to provide uniform heating across said mold cavity.

2. Apparatus as set forth in claim 1 wherein the dielectric constant of the additive material is greater than 100.

3. Apparatus as set forth in claim 1, wherein the mold material comprises a silicone rubber having a power factor on the order of 0.01, the additive material has a power factor on the order of 0.00032, and the material to be molded has a power factor on the order of 0.09, said power factors being measured at approximately 40 MHz.

4. Apparatus as set forth in claim 1, wherein said mold material is a silicone rubber and wherein said additive material is selected from the group consisting of calcium titanate and titanium dioxide.

5. An apparatus as set forth in claim 1 wherein said additive material is added to the mold material in relatively small percentages up to a maximum of 20%.

6. Apparatus as set forth in claim 1 wherein said additive material has a power factor lower than the power factor of said mold material.

7. Apparatus as set forth in claim 1 wherein said additive material has a dielectric constant greater than 100 and wherein said mold material has a dielectric constant of less than 10.

* * * * *